United States Patent
Victor et al.

(10) Patent No.: US 8,486,319 B2
(45) Date of Patent: Jul. 16, 2013

(54) ARTICLES WITH SUPER-HYDROPHOBIC AND/OR SELF-CLEANING SURFACES AND METHOD OF MAKING SAME

(75) Inventors: Jared J. Victor, Toronto (CA); Uwe Erb, Fraserville (CA); Klaus Tomantschger, Mississauga (CA); Nandakumar Nagarajan, Burlington (CA); Diana Facchini, Toronto (CA); Mioara Neacsu, Maple (CA)

(73) Assignee: Integran Technologies Inc., Toronto (CA)

( * ) Notice: Subject to any disclaimer, the term of this patent is extended or adjusted under 35 U.S.C. 154(b) by 231 days.

(21) Appl. No.: 12/785,662

(22) Filed: May 24, 2010

(65) Prior Publication Data

US 2011/0287203 A1    Nov. 24, 2011

(51) Int. Cl.
B29C 33/42        (2006.01)

(52) U.S. Cl.
USPC ........... 264/220; 264/284; 264/293; 264/299; 264/334; 264/337

(58) Field of Classification Search
USPC .................. 264/293, 220, 284, 299, 334, 337
See application file for complete search history.

(56) References Cited

U.S. PATENT DOCUMENTS

| | | |
|---|---|---|
| 3,303,111 A | 2/1967 | Peach |
| 3,354,022 A | 11/1967 | Dettre et al. |
| 4,168,183 A | 9/1979 | Greenfield |
| 4,529,668 A | 7/1985 | Croopnick et al. |
| 5,032,464 A | 7/1991 | Lichtenberger |
| 5,288,344 A | 2/1994 | Peker et al. |
| 5,302,414 A | 4/1994 | Alkhimov et al. |
| 5,352,266 A | 10/1994 | Erb et al. |
| 5,389,226 A | 2/1995 | Scruggs et al. |
| 5,433,797 A | 7/1995 | Erb et al. |
| 5,620,537 A | 4/1997 | Bampton |
| 5,649,994 A | 7/1997 | Holko |
| 5,753,251 A | 5/1998 | Burrel |
| 5,783,371 A | 7/1998 | Bifano |
| 5,863,410 A | 1/1999 | Yates |
| 5,872,074 A | 2/1999 | Schulz et al. |
| 6,660,363 B1 | 12/2003 | Barthlott |
| 6,764,745 B1 | 7/2004 | Karasawa et al. |

(Continued)

FOREIGN PATENT DOCUMENTS

| | | |
|---|---|---|
| CN | 101665968 | 3/2010 |
| DE | 10108893 | 10/2002 |

(Continued)

OTHER PUBLICATIONS

Lee et al, Fabrication of Hierarchical Structures on a Polymer Surface to Mimic Natural Superhydrophobic Surfaces, 2007, Adv. Mater., 19, 2330-2335.*

(Continued)

*Primary Examiner* — Timothy Kennedy
(74) *Attorney, Agent, or Firm* — Rankin Hill & Clark LLP (57) ABSTRACT

Super-hydrophobic and self-cleaning articles produced by imprinting exposed surfaces with suitable fine-grained and/or amorphous metallic embossing dies to transfer a dual surface structure, including ultra-fine features less than or equal to 100 nm embedded in and overlaying a surface topography with macro-surface structures greater than or equal to 1 micron are disclosed.

14 Claims, 3 Drawing Sheets

U.S. PATENT DOCUMENTS

| | | | |
|---|---|---|---|
| 6,872,441 | B2 | 3/2005 | Baumann et al. |
| 6,895,795 | B1 | 5/2005 | Chaudhury et al. |
| 7,575,040 | B2 | 8/2009 | Johnson |
| 7,803,072 | B2 | 9/2010 | Palumbo |
| 2003/0187170 | A1 | 10/2003 | Burmeister |
| 2003/0234181 | A1 | 12/2003 | Palumbo |
| 2005/0003146 | A1 | 1/2005 | Spath |
| 2005/0205425 | A1 | 9/2005 | Palumbo et al. |
| 2006/0135281 | A1 | 6/2006 | Palumbo et al. |
| 2007/0031639 | A1 | 2/2007 | Hsu et al. |
| 2008/0217180 | A1 | 9/2008 | Doye et al. |
| 2009/0011222 | A1* | 1/2009 | Xiu et al. ............ 428/323 |
| 2009/0159451 | A1 | 6/2009 | Tomantschger et al. |
| 2009/0246473 | A1 | 10/2009 | Lee et al. |
| 2009/0317590 | A1 | 12/2009 | Hwang et al. |

FOREIGN PATENT DOCUMENTS

| | | |
|---|---|---|
| DE | 10228323 | 1/2004 |
| EP | 2045368 | 4/2009 |
| KR | 100845744 | 7/2008 |
| WO | WO 2008100583 A1 * | 8/2008 |

OTHER PUBLICATIONS

Khan et al, Nanocrystalline aluminum and iron: Mechanical behavior at quasi-static and high strain rates, and constitutive modeling, 2006, Int. J. of Plasticity, 22, 195-209.* http://aluminium.matter.org.uk/content/html/eng/default. asp?catid=179&pageid=2144416668 (retrieved Jun. 12, 2012).*

Feng et al, Super-Hydrophobic Surfaces: From Natural to Artificial, 2002, Adv. Mater, 14, 1857-1860.*

Jack Champaigne Electonics Inc, Shot Peening Overview, 2001, 1-37.*

Liu et al, A replication strategy for complex micro/nanostructures with superhydrophobicity and superoleophobicity and high contrast adhesion, Jun. 29, 2009, Soft Matter, vol. 5, pp. 3097-3105.*

F. Mueller, "Pulse Plating & Other Myths", Plating & Surface Finishing, pp. 54-55, Apr. 2000.

D. Gabe et. al., "Protective Layered Electrodeposits", Electrochemica Acta, vol. 39, No. 8/9, pp. 1115-1121, 1994.

S.J. Bull et. al., "Multilayer Coatings for Improved Performance", Surface & Coating Technology 78 (1996) 173-184.

D. Facchini, J. L McCrea, F. González, K. Tomantschger, and G. Palumbo, "Small Crystals, Big Benefits: Nanotech cobalt alloy coatings offer hard chrome alternative", Product Finishing, 73, 7, p. 14-18, Apr. 2009.

D. Facchini, J. L McCrea, F. González, G. Palumbo, K. Tomantschger and U. Erb, "Nanostructured Metals and Alloys—Electrodeposited Nanostructured Cobalt Phosphorus Coatings as a Hard Chrome Alternative for Functional Applications," In: Jahrbuch Oberflächentechnik 64 2008: pp. 34-45.

B. Stein, A Practical Guide to Understanding, Measuring and Controlling Stress in Electroformed Metals, AESF Electroforming Symposium, Mar. 27-29, 1996, 1-6, Las Vegas, NV, USA.

Palumbo, G.; González, F.; Tomantschger, K.; Erb, U.; Aust, K.T. "Nanotechnology opportunities for electroplating industries" Plating and Surface Finishing, v 90, n 2, p. 36-45, Feb. 2003.

Kim, Simon H.; Erb, U.; Aust, K.T.; Gonzalez, F.; Palumbo, G., "The corrosion behavior of nanocrystalline electrodeposits" Plating and Surface Finishing, v 91, n 5, p. 68-70, May 2004.

Gonzalez, F. McCrea, J. Palumbo, G. Erb, U., "Nanostructured Electrodeposited Cobalt: An Alternative to Hard Chromium", Bulletin—Cercle D Etudes Des Metaux Saint Etienne, 2004, vol. 17; Issu 9, pp. 27.

Karimpoor, A.A.; Erb, U.; Aust, K.T.; Palumbo, G. "High strength nanocrystalline cobalt with high tensile ductility" Scripta Materialia, v 49, n 7, p. 651-6, Oct. 2003.

Karimpoor, A.A.; Erb, U.; Aust, K.T.; Wang, Z.; Palumbo, G "Tensile properties of bulk nanocrystalline hexagonal cobalt electrodeposits" Materials Science Forum, v 386-388, p. 415-20, 2002.

Kim, S.H.; Aust, K.T.; Erb, U.; Gonzalez, F.; Palumbo, G "A comparison of the corrosion behaviour of polycrystalline and nanocrystalline cobalt" Scripta Materialia, v 48, n. 9, p. 1379-84, May 2003.

Hibbard, G.; Aust, K.T.; Palumbo, G.; Erb, U. "Thermal stability of electrodeposited nanocrystalline cobalt" Scripta Materialia, v 44, n 3, p. 513-18, Mar. 16, 2001.

Osmola, D.; Renaud, E.; Erb, U.; Wong, L.; Palumbo, G.; Aust, K.T. "Synthesis of nanocrystalline Co-W alloys" Materials Research Society Symposium Proceedings, v 286, p. 191-196, 1992.

Hibbard, G.D.; Palumbo, G.; Aust, K.T.; Erb, U. "Nanoscale combined reactions: non-equilibrium α-Co formation in nanocrystalline & epsi;-Co by abnormal grain growth" Philosophical Magazine, v 86, n 2, p. 125-39, Jan. 11, 2006.

Szpunar, Barbara; Aus, Martin; Cheung, Cedric; Erb, Uwe; Palumbo, Gino; Szpunar, Jerzy A "Magnetism in nanostructured Ni-P and Co-W alloys" Journal of Magnetism and Magnetic Materials, v 187, n 3, p. 325-336, Sep. 1, 1998.

Hibbard, G.D.; Aust, K.T.; Erb, U. "The effect of starting nanostructure on the thermal stability of electrodeposited nanocrystalline Co" Acta Materialia, v 54, n 9, p. 2501-10, May 2006.

Karimpoor, A.A.; Erb, U. "Mechanical properties of nanocrystalline cobalt" Physica Status Solidi A, v 203, n 6, p. 1265-70, May 2006.

Karimpoor, A.A.; Aust, K.T.; Erb, U. "Charpy impact energy of nanocrystalline and polycrystalline cobalt" Scripta Materialia, v 56, n 3, p. 201-4, Feb. 2007.

Hibbard, G.D.; Aust, K.T.; Erb, U. "Thermal stability of electrodeposited nanocrystalline Ni-Co alloys" Materials Science and Engineering A, v 433, n 1-2, p. 195-202, Oct. 15, 2006.

Mohammadreza Baghbanan, Uwe Erb, Gino Palumbo "Towards the application of nanocrystalline metals in MEMS" Physica Status Solidi (a), 203, 6, p. 1259-1264, 2006.

Eric W. Brooman, "Wear behavior of environmentally acceptable alternatives to chromium coatings: cobalt-based and other coatings" Metal Finishing, vol. 102, Issue 10, Oct. 2004, pp. 42-54.

M.A. Sheikholeslam, M.H. Enayati and K. Raeissi, "Characterization of nanocrystalline and amorphous cobalt—phosphorous electrodeposits" Materials Letters, vol. 62, Issues 21-22, Aug. 15, 2008, pp. 3629-3631.

Ms. Diana Facchini, Dr. Jonathan McCrea, Mr. Iain Brooks, Dr. Francisco Gonzalez, Dr. Gino Palumbo. "Electrodeposited Nanocrystalline Metals and Alloys as Environmentally Compliant Alternative Coatings to Functional Hexavalent Chromium and Cadmium" Aeromat 2009, Dayton OH, Jun. 9, 2009.

D. Facchini, N. Mahalanobis, F. Gonzalez, R. A. Prado, J. Benfer, K. Legg "Nanocrystalline Cobalt-Alloy Coatings for Chrome Replacement Applications" SERDP/ESTCP Partners in Environmental Technology Symposium, Washington DC, Dec. 1-3, 2009.

D. Facchini, Dr. Jon McCrea, Dr. Francisco Gonzalez, Dr. Gino Palumbo Ruben Prado, Dr. Keith Legg "Nanocrystalline Cobalt-Alloy Coatings for Chrome Replacement Applications" SERDP/ESTCP Partners in Environmental Technology Symposium, Washington DC, Dec. 2-4, 2008.

D. Facchini, J.L. McCrea, F. Gonzalez, R. Prado, K. Legg and G. Palumbo "Nanocrystalline Cobalt-Alloy Coatings for Non-Line-of-Sight Chrome Replacement Applications" SERDP/ESTCP Partners in Environmental Technology Sumposium, Washington DC, Dec. 4-6, 2007.

Diana Facchini, Ruben Prado "Electrodeposition of Nanocrystalline Co-P Coatings as a Hard Chrome Alternative", ASETS Defense Meeting, Denver, Colorado, Sep. 2, 2009.

Diana Facchini, Ruben Prado, Keith Legg "Electrodeposited Nano Co-P: Coating Development and Technology Insertion at NADEP-JAX" Surface Finishing and Repair Issues for Sustaining New Military Aircraft, Phoenix, Arizona, Feb. 27, 2008.

Paco Gonzalez, "Dem-Val of Electrodeposited Nano Co-P Alloys for NLOS Coating Applications at NADEP Jacksoville" HCAT Meeting, San Diego, California, Jan. 25, 2006.

Paco Gonzalez, "Electrodeposited nCoP as an Alterantive to EHC", HCAT Meeting, Greensboro, North Carolina, Mar. 15-17, 2005.

Paco Gonzalez, "Nanocrystalline CoP for Cr-Replacement", HCAT Meeting, Park City, Utah, Jul. 20-21, 2004.

Jonathan L. McCrea, Paco Gonzalez, Doug Lee and Uwe Erb "Electroformed Nanocrystalline Coatings an Advanced Alternative to Hard-Chrome Electroplating PP-1152" HCAT Meeting, Cape Canaveral, Florida, Nov. 18-19, 2003.

Douglas E. Lee, Dr. Jonathan L. McCrea, Dr. Uwe Erb, "Electroformed Nanocrystalline Coatings An Advanced Alternative to Hard-Chrome Electroplating PP-1152" HCAT Meeting, San Diego, California, Apr. 2, 2003.

Dr. Maureen J. Psaila-Dombrowski, Douglas E. Lee, Dr. Jonathan L. McCrea, Dr. Uwe Erb, "Electroformed Nanocrystalline Coatings an Advanced Alternative to Hard-Chrome Electroplating PP-1152" Toronto, Ontario, Sep. 26, 2002.

Dr. Maureen J. Psaila-Dombrowski, Douglas E. Lee, Dr. Jonathan L. McCrea, Dr. Uwe Erb, "Electroformed Nanocrystalline Coatings an Advanced Alternative to Hard-Chrome Electroplating PP-1152" HCAT Meeting, Toronto, Ontario, Aug. 30, 2001.

Nihad Ben Salah, S. Beskri and J. Sapieha, "Development of nano-Co-P plating as a replacement for hard chrome for engine components", SERDP/ESTCP Workshop—Surface finishing and repair issues, Tempe, AZ, Feb. 26-28, 2008.

Dr. E.W. Brooman, Mr. T.A. Naguy, Dr. M.L. Klingenberg, "Evaluation of Alternatives to Hard Chromium Coatings for Air Force Repair and Overhaul Applications", SUR/FIN 2007, Cleveland, OH, Aug. 13-16, 2007.

McCrea, J.L. Facchini, D., Gonzalez, F. and Palumbo, G., "Nanocrystalline Cobalt-Alloy Coatings for Non-Line-of-Sight Chrome Replacement Applications," in Proceedings of SUR/FIN 2007, Cleveland, OH (2007).

International Search Report and Written Opinion of PCT/EP2011/058311 dated Aug. 24, 2011.

U.S. Appl. No. 12/785,650, filed May 24, 2010 and titled "Metallic Articles With Hydrophobic Surfaces".

U.S. Appl. No. 12/785,524, filed May 24, 2010 and titled "Metal-Clad Polymer Article".

U.S. Appl. No. 12/785,520, filed May 24, 2010 and titled "Electrodeposited Metallic Materials Comprising Cobalt".

Office Action of U.S. Appl. No. 12/785,650 dated May 24, 2010.

Office Action of U.S. Appl. No. 12/785,650 dated Jun. 4, 2012.

Pacifico, Superhydrophobic Effects of Self-Assembled Monolayers on Micropatterned Surfaces: 3-D Arrays Mimicking the Lotus Leaf, Langmuir 2006, 22, 11072-11076.

Shafiei, Mehdi and Alpas, Ahmet; "Nanocrystalline Nickel Films with Lotus Leaf Texture for Superhydrophobic and Low Frictions Surfaces" Applied Surface Science 256 (2009) 710-719.

Zhou, Yali, et al.; "Superhydrophobic Surface Created by the Silver Mirror Reaction and its Drag-Reduction Effect on Water;" J. Mater. Chem., 2009, 19, 3301-3306.

* cited by examiner

ARTICLES WITH SUPER-HYDROPHOBIC AND/OR SELF-CLEANING SURFACES AND METHOD OF MAKING SAME

FIELD OF THE INVENTION

The present invention relates to articles having exposed patterned surfaces which, at least in part, are super-hydrophobic and/or self-cleaning. The exposed surfaces have a dual microstructure including ultra-fine features equal to or less than 100 nm embedded in and overlaying a surface topography with macro-surface structures equal to or greater than 1 micron and are produced by intimate contact with fine-grained and/or amorphous embossing dies containing a relief pattern of the same surface topography.

BACKGROUND OF THE INVENTION

The present invention generally relates to a method of suitably texturing at least part of the exposed surface(s) of an article with a dual surface structure which is inherently water repellant including, but not limited to, organic polymers optionally containing a variety of additives and/or fillers, by employing amorphous and/or fine-grained metallic embossing dies or molds exhibiting a relief pattern containing a dual surface structure.

Water repellant (hydrophobic), super-hydrophobic and self-cleaning surfaces are desired in numerous applications involving, at least at times, exposure to the atmosphere or water. According to the prior art, known super-hydrophobic surfaces (contact angle for water greater than or equal to 150°) which are self-cleaning are created by introducing artificial surface structures including elevations and/or depressions in a smooth surface of an inherently hydrophobic material (contact angle for water greater than 90°), for example, organic polymers or coatings. Suitable distances between the elevations and/or depressions are reported to be in the range of from 5 µm to 200 µm, and the heights and/or depths of the elevations and/or depressions are in the range of from 5 µm to 100 µm.

The prior art describes various means of increasing the water repellent properties of hydrophobic surfaces by roughening.

U.S. Pat. No. 3,354,022 describes water repellent surfaces having an intrinsic advancing water contact angle of more than 90° and an intrinsic receding water contact angle of at least 75° by creating a micro rough structure with elevations and depressions in a hydrophobic material. The high and low portions have an average distance of not more than 1,000 microns, an average height of high portions of at least 0.5 times the average distance between them. The air content is at least 60% and, in particular, fluorine containing polymers are disclosed as the hydrophobic material. The water repellent surfaces are created using an embossing die made of hollow polymer fibers. Unfortunately, such embossing dies are cumbersome to produce and have a limited durability.

U.S. Pat. No. 6,660,363 describes self-cleaning surfaces of objects made of hydrophobic polymers or permanently hydrophobized materials which have an artificial surface structure of elevations and depressions. The distances between the elevations are in the range of from 5 µm to 200 µm, and the heights of the elevations are in the range of from 5 µm to 100 µm. At least the elevations consist of hydrophobic polymers or permanently hydrophobized materials. The elevations cannot be wetted by water or by water containing detergents by attaching PTFE particles (7 micron in diameter) to a polymer adhesive film containing surface and curing the structure or by using a fine mesh screen to emboss a polymer surface by hot pressing. According to the '363 patent, such surfaces are produced by application of a dispersion of powder particles of an inert material in a siloxane solution, and subsequent curing the siloxane solution to form a polysiloxane. Unfortunately, the structure forming particles do not adhere well to the surface, are cumbersome to produce, and have a limited durability.

U.S. Patent Publication No. 2003/0187170 discloses a process for producing nanostructured and microstructured polymer films by guiding the polymer through a gap formed by a suitably patterned roll and a means which develops an opposing pressure so that the polymer film is deformed and shaped in accordance with the relief pattern. No information is provided in the '170 publication to substantiate the nanostructured features disclosed or to demonstrate the wetting behavior of the embossed polymer films.

U.S. Pat. No. 6,764,745 describes a structural member in which high water-repellency can be obtained by forming appropriate irregularities on the external surface. The irregularities comprise protrusion portions of uniform height and shaped as prisms and which are subsequently coated with a water repellent film of PTFE or fluoroalkylsilane. The surface features termed "irregularities" have such dimensions that a water droplet cannot fall into the air-filled recesses. This approach requires multiple materials and/or layers and a final topcoat to render the article superhydrophobic.

U.S. Pat. No. 6,872,441 describes glass, ceramic and metal substrates with at least one self-cleaning surface comprising a layer with a micro-rough surface structure which is arranged on the substrate and made at least partly hydrophobic. The layer contains a glass flux and structure-forming particles with a mean particle diameter within the 0.1 to 50 micron range. The micro-rough surface structure has a ratio of mean profile height to mean distance between adjacent profile tips within the 0.3 to 10 micron range. The surface layer is produced by coating the substrate with a composition containing a glass flux and structure-forming particles, and the is layer is burnt in and made hydrophobic. This approach requires multiple materials and/or layers and a final topcoat to render the article superhydrophobic and is rather complex.

U.S. Ser. No. 12/785,650, entitled "METALLIC ARTICLES WITH HYDROPHOBIC SURFACES", which has a common assignee and is filed concurrently with the present application, describes articles having exposed metallic surfaces comprising durable, fine-grained and/or amorphous microstructures which, at least in part, are rendered water repellant by suitably texturing and/or roughening the surface to increase the contact angle for fluids including water, thus reducing the wetting behavior of the surface, reducing corrosion and enabling efficient cleaning and drying.

The prior art also addresses the fabrication of fine-grained and/or amorphous metallic coatings and articles for a variety of applications.

U.S. Pat. No. 3,303,111 discloses amorphous nickel phosphorus (Ni—P) and/or cobalt phosphorus (Co—P) coatings using electroless deposition.

U.S. Pat. No. 5,389,226 discloses amorphous and microcrystalline electrodeposited nickel-tungsten (Ni—W) coatings of high hardness, wear and corrosion resistance and low residual stress to avoid cracking and lifting of the coating from the substrate.

U.S. Pat. No. 5,032,464 discloses smooth ductile alloys of a transition metal and phosphorus, particularly nickel phosphorus (Ni—P) with high ductility (up to 10%) produced by electrodeposition.

U.S. Pat. No. 5,288,344 describes beryllium (Be)-bearing alloys which form amorphous metallic glasses upon cooling below the glass transition temperature at a cooling rate appreciably less than $10^6$ K/s.

U.S. Pat. No. 7,575,040 describes a process for continuous casting amorphous metal sheets by stabilizing the molten alloy at casting temperature, introducing the alloy onto a moving casting body, and quenching the molten alloy to solidify it.

U.S. Pat. No. 5,352,266 and U.S. Pat. No. 5,433,797, which are assigned to the same assignee, describe a process for producing nanocrystalline materials, particularly nanocrystalline nickel. The nanocrystalline material is electrodeposited onto the cathode in an aqueous acidic electrolytic cell by application of a pulsed current.

U.S Patent Publication No. 2005/0205425 and DE 10228323, both being assigned to the same assignee as the present application, disclose a process for forming coatings, layers or freestanding deposits of nanocrystalline metals, metal alloys or metal matrix composites. The process employs tank plating, drum plating or selective plating processes using aqueous electrolytes and optionally a non-stationary anode or cathode. Nanocrystalline metal matrix composites are disclosed as well.

U.S. Patent Publication No. 2009/0159451, which has a common assignee as the present application, discloses graded and/or layered, variable property electrodeposits of fine-grained and amorphous metallic materials, optionally containing solid particulates.

U.S. Ser. No. 12/548,750, assigned to the same assignee as the present application, discloses fine-gained and amorphous metallic materials comprising cobalt (Co) of high strength, ductility and fatigue resistance.

U.S. Ser. No. 12/785,524, which is a continuation-in part of U.S. Ser. No. 12/476,455, entitled "METAL CLAD POLYMER ARTICLE", and is filed concurrently with the present application, discloses metal-clad polymer articles comprising polymeric materials having fine-grained (average grain-size of 2 nm to 5,000 nm) or amorphous metallic materials of enhanced pull-off strength between the metallic material and the polymer which are optionally wetproofed.

DE 10108893 describes the galvanic synthesis of fine-grained group II to group V metals, their alloys and their semiconductors compounds using ionic liquid or molten salt electrolytes.

U.S. Pat. No. 5,302,414 describes a cold gas-dynamic spraying method for applying a coating to an article by introducing metal or metal alloy powders, polymer powders or mixture thereof into a gas stream. The gas and particles, which form a supersonic jet having a velocity of from about 300 m/sec to about 1,200 m/sec, are directed against a suitable substrate to provide a coating thereon.

U.S. Pat. No. 6,895,795 describes a method of processing a billet of metallic material in a continuous manner to produce severe plastic deformation. The billet is moved through a series of dies in one operation to produce a billet with a refined grain structure.

U.S. Pat. No. 5,620,537 describes a method of superplastic extrusion for fabricating complex-shaped, high strength metal alloy components by carefully controlling strain rate and temperature to retain an ultra-fine grained microstructure, A high strength, heat treatable metal alloy is first processed, such as by equal channel angular extrusion (ECAE), to have a uniform, equiaxed, ultra-fine grain size in thick section billet form.

Thus, the prior art teaches that, in order to substantially raise the contact angle for water, surface features need to be introduced to the exposed surface of an inherently non-wetting material as illustrated in numerous naturally occurring structures. The material has to be inherently hydrophobic and has to contain a patterned surface comprising suitable depressions and/or elevations as observed in lotus or aspen leaves, rose petals, etc.

Numerous attempts have been made to replicate nature as noted above to achieve super-hydrophobic and/or self-cleaning properties in man-made articles. As indicated previously, U.S. Patent Publication No. 2003/0187170 describes embossed polymer surfaces with nano-sized and micro-sized structures by shaping/patterning the polymer surface with appropriate processes including injection molding, die embossing, or rotary embossing. The relief pattern on the forming tool can be created by sandblasting, etching, laser ablation, lithographic techniques, offset printing, electroplating techniques, LIGA and/or erosion. The '170 publication guides towards the employ of LIGA to create forming tools with dimensions in the nanometer range (100 nm to 300 nm depth). The use of galvanoforming to generate the forming tool by plating onto a negative hollow mold of plaster, wax etc. is disclosed as well. The working examples illustrate the production of forming tools using LIGA with the smallest dimension (depth) being 1,000 nm (1 micron). None of the working examples illustrate the generation of nano-structured features overlaying a micro-structured features as set forth in the present application, i.e., a dual structure composed of a primary features in the 1 μm to 1,000 μm range (i.e., a primary structure) overlayed by a secondary structure with ultra-fine features in the range of between 1 nm and 100 nm. The only plausible interpretation of the '170 publication suggests that the spacing and/or height/depth of the micro-structures themselves can have a dimension in the nanometer range. However, there is no teaching or suggestion in the '170 publication of a dual microstructure including ultra-fine features equal to or less than 100 nm embedded in and overlaying a surface topography with macro-surface structures equal to or greater than 1 micron of the present application.

The '170 publication discloses the use of metallic or a polymeric materials as an imprinting tool. The '170 publication, however, makes no distinction with respect to the material microstructure and all information provided suggests to the person skilled in the art that, in the case of using metallic imprinting rolls, conventional metallic materials such as steel with a coarse grained microstructure (average grain size greater than 30 microns) are being employed. Similarly, the general electroforming techniques disclosed would produce coarse-grained deposits. As highlighted, the only dimension in the nanometer range disclosed by the '170 publication is the depth of the structure which ranges over six (6) orders of magnitude, from 10 nm to 10,000,000 nm (10,000 μm). Notably, no single contact angle measurement, tilt angle measurement or any evidence of super-hydrophobic properties using the process disclosed, are provided in the '170 publication.

SUMMARY OF THE INVENTION

The Applicants have surprisingly discovered that prior art depressions and/or elevations (hereafter termed "primary structure") can be conveniently textured to create an overlaying ultra-fine/nanometer-sized profile (hereafter termed "secondary structure") on the micrometer (μm) sized features when employing fine-grained and/or amorphous metallic embossing dies. Embossing dies or forming reliefs according to the present invention must contain both micrometer (μm) sized depressions/elevations and, in addition, an ultra-fine/nanometer-sized pattern in order to significantly increase the contact angle of materials such as polymers embossed with such dies. The Applicants have furthermore discovered that the secondary structure is indeed transferred from the metallic forming dies onto the embossed polymer surface, at least in part, due to the generally non-wetting properties of the metallic forming die itself.

The Applicants have also surprisingly discovered that the surface of fine-grained and/or amorphous metallic material can readily be textured to form desired nanostructured and microstructured features required on the embossing die surface. The same approach does not result in the same performance when prior art coarse-grained metallic embossing dies are employed which are processed the very same way.

It is therefore an objective of the present invention to provide a convenient process which established a dual structure embossing die surface containing a nanostructured pattern overlayed on a microstructured surface for use to suitably imprint polymer or other material surfaces, preferably in a single step, and render such processed surfaces super-hydrophobic and self-cleaning.

It is an objective of the present invention to utilize durable metallic materials comprising an amorphous and/or fine-grained microstructure on and near the embossing die surface.

It is an objective of the present invention to suitably nano-texture and micro-texture metallic materials comprising an amorphous and/or fine-grained microstructure for embossing of suitable materials including, but not limited to, polymers, by a convenient process, preferably by a two step process comprising shot-peening followed by etching.

It is an objective of the present invention to create suitable nanostructured and microstructured metallic surfaces comprising fine-grained and/or amorphous metallic materials for use to emboss/imprint surfaces of hydrophobic materials to raise the contact angle and/or lower the tilt angle, including, but not limited to, polymers by forming various recesses and depressions which extend inwardly from the original surface of the metallic material and/or by forming various elevations which protrude from the original surface of the metallic material.

It is an objective of the present invention to provide articles wherein the wetproofed embossed material surface extends over between 1% and 100% of the total exposed surface of the article.

It is an objective of the present invention to provide durable, scratch and abrasion resistant, strong, lightweight articles with at least partially embossed outer surfaces for use in various applications, e.g., in transportation applications (including automotive, aerospace, ships and other vessels navigating in and on water, and their components), defense applications, industrial components, building materials, consumer products, electronic equipment or appliances and their components, sporting goods, molding applications and medical applications.

It is an objective of the invention to provide suitably nano-patterned and micro-patterned metallic embossing dies selected from the group of amorphous and/or fine-grained metals, metal alloys or metal matrix composites. The exposed metallic layer comprises at least some fine-grained and/or amorphous metallic materials which can be produced in free-standing form or can be applied to suitable permanent substrates by a large variety of metal forming or deposition processes. Preferred metal deposition processes which can be used to produce a microstructure which is fine-grained and/or amorphous are selected from the group of electroless deposition, electrodeposition, physical vapor deposition (PVD), chemical vapor deposition (CVD), cold spraying and gas condensation. Other metal processing techniques for rendering the microstructure of metallic material fine grained, e.g., severe plastic deformation, or for rendering the microstructure amorphous, e.g., rapid solidification, are contemplated as well.

It is an objective of the present invention to provide single or multiple structural metallic layers for use as nano-overlayed, micro-patterned embossing dies having a microstructure selected from the group of fine-grained, amorphous, graded and layered structures, which have a total thickness in the range of between 1 micron and 2.5 cm, preferably between 50 micron and 2.5 mm and more preferably between 100 micron and 500 micron.

The fine-grained and/or amorphous metallic material of the embossing dies has a high yield strength (25 MPa to 2,750 MPa) and ductility (0.1% to 45%).

It is an objective of the present invention to utilize the enhanced mechanical strength and wear properties of fine-grained metallic coatings/layers with an average grain size between 1 nm and 5,000 nm, and/or amorphous coatings/layers and/or metal matrix composite coatings/layers as embossing dies. Metal matrix composites (MMCs) in this context are defined as particulate matter embedded in a fine-grained and/or amorphous metal matrix. MMCs can be produced, e.g., in the case of using an electroless plating or electroplating process, by suspending particles in a suitable plating bath and incorporating particulate matter into the deposit by inclusion or, e.g., in the case of cold spraying, by adding non-deformable particulates to the powder feed.

It is an objective of the present invention to suitably texture at least portions of the metallic surfaces to form a large number of micron-sized features including at least one of recesses, protrusions and elevations termed "micron-sized surface structures" or "micron-sized surface sites" per unit area. Recesses can be formed by suitably removing material from the smooth surface, while elevations can be formed by suitably texturing a mold surface and applying the fine grained and/or amorphous metallic material to the mold surface, e.g., by electroless or electrodeposition, followed by removal of the metallic layer from the mold.

It is an objective of the present invention to optionally coat the suitable patterned and textured metallic embossing dies surface by applying a top coat comprising a metallic, ceramic or organic coating or transfer it onto a secondary embossing dies to change the structures from protrusions to recesses or vice-versa.

It is an objective of the present invention to suitably create numerous pits and crevices or protrusions in at least portions of the outer surface of the metallic embossing dies that are randomly and/or evenly distributed which form the primary structure of the relief pattern surface used for embossing. The shape, size and population of sites such as recesses, pits, crevices, depressions and the like is believed to enable the entrapment of air thus providing for the "lotus" or "petal" effect observed in nature. It is an objective to create micro-sized surface structures exceeding a density of between 25 and 10,000 sites per $mm^2$ area, preferably between 100 and 5,000 sites per $mm^2$ area or a range of between 5 and 100 sites per mm. Surface sites range from 5-100 micron in depth, preferably 10-50 micron in depth; from 5-100 micron in diameter, preferably from 10-50 micron in diameter, spaced between 5-100 micron apart, preferably between 10 and 50 micron apart.

It is an objective of the present invention to suitably overlay the primary surface features with an ultra-fine pattern of secondary surface features which can be conveniently created using metallic materials for embossing dies having a fine-grained and/or amorphous microstructure as illustrated.

It is an objective of the present invention to render inherently hydrophobic surfaces super-hydrophobic (contact angle for water greater than 150°) and self-cleaning (tilt angle less than 5°) by introducing surface structures therein containing a plurality of micron-sized features, wherein the plurality of micron-sized features furthermore preferably has a substructure comprising of a plurality of nanoscale features, i.e., the surface sites contain both micro and nano structured features.

It is an objective of the invention to suitably create metallic surface having a low roll-off angle (tilt angle for water less than 25°), preferably a self-cleaning surface having tilt angle for water less than 5°), and/or high contact angle for water (contact angle greater than 125°) by an economic, convenient and reproducible process.

It is an objective of the present invention to apply suitably structured fine-grained and/or amorphous metallic relief forms to at least a portion of the surface of a part made or being made substantially of any suitable material, including, but not limited to polymers, composites and ceramics, suitably modifying at least portions of said outer surface in contact with the relief form to render it hydrophobic.

It is an objective of the present invention to provide lightweight articles comprising, at least in part, liquid repellent and/or self-cleaning outer surfaces with increased wear, erosion and abrasion resistance, durability, strength, stiffness, thermal conductivity and thermal cycling capability.

It is an objective of the present invention to provide articles with at least in part liquid repellent and/or self-cleaning outer surfaces for a variety of applications including, but not limited to:

(i) applications requiring cylindrical objects including gun barrels; shafts, tubes, pipes and rods; golf and arrow shafts; skiing and hiking poles; various drive shafts; fishing poles; baseball bats, bicycle frames, ammunition casings, wires and cables and other cylindrical or tubular structures for use in commercial goods;

(ii) medical equipment including orthopedic prosthesis and surgical tools crutches, wheel chairs and medical equipment including orthopedic prosthesis, implants and surgical tools;

(iii) sporting goods including golf shafts, heads and faceplates; lacrosse sticks; hockey sticks; skis and snowboards as well as their components including bindings; racquets for tennis, squash, badminton; bicycle parts;

(iv) components and housings for electronic equipment including laptops; televisions and handheld devices including cell phones; personal digital assistants (PDAs) devices; walkmen; discmen; digital audio player, e.g., MP3 players; e-mail functional telephones, e.g., a BlackBerry®-type device; cameras and other image recording devices;

(v) automotive components including heat shields; cabin components including seat parts, steering wheel and armature parts; fluid conduits including air ducts, fuel rails, turbocharger components, oil, transmission and brake parts, fluid tanks and housings including oil and transmission pans; cylinder head covers; spoilers; grill-guards and running boards; brake, transmission, clutch, steering and suspension parts; brackets and pedals; muffler components; wheels; brackets; vehicle frames; spoilers; fluid pumps such as fuel, coolant, oil and transmission pumps and their components; housing and tank components such as oil, transmission or other fluid pans including gas tanks; electrical and engine covers;

(vi) industrial/consumer products and parts including linings on hydraulic actuator, cylinders and the like; drills; files; saws; blades for knives, turbines and windmills; sharpening devices and other cutting, polishing and grinding tools; housings; frames; hinges; sputtering targets; antennas as well as electromagnetic interference (EMI) shields;

(vii) molds and molding tools and equipment;

(viii) aerospace parts and components including wings; wing parts including flaps and access covers; structural spars and ribs; propellers; rotors; rotor blades; rudders; covers; housings; fuselage parts; nose cones; landing gear; lightweight cabin parts; cryogenic storage tanks; ducts and interior panels; and (ix) military products including ammunition, armor as well as firearm components, and the like; that are coated with fine-grained and/or amorphous metallic layers that are stiff, lightweight, resistant to abrasion, resistant to permanent deformation, do not splinter when cracked or broken and are able to withstand thermal cycling without degradation.

Accordingly, the invention in one exemplary embodiment is directed to an article comprising an outer surface comprising a polymeric material with at least a portion thereof having a dual surface microstructure having one of a contact angle for water at room temperature greater than or equal to 130° and a tilt angle for water at room temperature less than or equal to 25°. The dual surface microstructure of the portion of the article outer surface comprises a primary surface structure and a secondary surface structure at least partially overlaying the primary surface structure. The primary surface structure has surface features having dimensions and a spacing between adjacent primary surface features in the range of 1 micron to 1,000 microns. The secondary surface structure has surface features having dimensions and a spacing between adjacent secondary surface features in the range of 1 nm to less than or equal to 100 nm.

Accordingly, the invention in another exemplary embodiment is directed to an article formed of a polymeric material comprising an outer surface with at least a portion thereof having a dual surface microstructure. The dual surface microstructure of the outer surface portion including ultra-fine surface features having dimensions less than or equal to 100 nm embedded in and overlaying macro-surface features having dimensions greater than 1 micron. The dual surface microstructure raises the contact angle in the outer surface portion by at least 35° and decreases the tilt angle in the outer surface portion by at least 10° for deionized water at room temperature when compared to a smooth outer surface portion of the article of the same composition.

Accordingly, the invention in yet another exemplary embodiment is directed to a method for manufacturing an article formed of a polymeric material and having one of a hydrophobic and self-cleaning outer surface. The method for manufacturing comprises the steps of:

(i) providing an embossing die formed of a metallic material, the metallic material having at least one of a microstructure which is fine-grained with an average grain size between 2 and 5,000 nm and an amorphous microstructure;

(ii) incorporating surface structures into at least an exposed surface portion of the embossing die, the surface structures increasing the contact angle for water at room temperature to over 90° and rendering the inherently hydrophilic surface of the metallic material hydrophobic; and (iii) imprinting at least a portion of an outer surface of the article with the imprinted surface portion of the embossing die to at least one of increase the contact angle for water at room temperature of said outer surface portion to at least 130° and decrease the tilt angle for water at room temperature of said outer surface portion to less than or equal to 25°.

According to exemplary embodiments of the present invention, a method for manufacturing an article having an exposed (outer or inner) surface, comprising at least portions that are rendered wetting resistant, hydrophobic and/or self-cleaning, is disclosed. A wetting-resistant surface, in the most common embodiment, exhibits resistance to wetting by water. However, the use of other liquids including organic liquids such as, for example, alcohols and the like, are contemplated as well. Unless otherwise indicted, the liquid is deionized water.

As used herein, the term "contact angle" or "static contact angle" is referred to as the angle between a static drop of deionized water and a flat and horizontal surface upon which the droplet is placed.

As is well known in the art the contact angle is used as a measure of the wetting behavior of a surface. If a liquid spreads completely on the surface and forms a film, the contact angle is zero degrees (0°). As the contact angle increases, the wetting resistance increases, up to a theoretical maximum of 180°, where the liquid forms spherical drops on the surface. The term "wet-proof" is used to describe surfaces having a high wetting resistance to a particular reference liquid; "hydrophobic" is a term used to describe a wetting resistant surface where the reference liquid is water. As used herein, the term "wetproof" and "hydrophobic" refers to a surface that generates a contact angle of greater than 90° with a reference liquid. As the wetting behavior depends in part upon the surface tension of the reference liquid, a given surface may have a different wetting resistance (and hence form a different contact angle) for different liquids. As used herein, the term "substrate" is not construed to be limited to any shape or size, as it may be a layer of material, multiple layers or a block having at least one surface of which the wetting resistance is to be modified.

As used herein the "inherent contact angle" or "intrinsic contact angle" is characterized by the contact angle for a liquid measured on a flat and smooth surface not containing any surface structures. Unless otherwise indicted, the liquid is deionized water.

As used herein the term "smooth surface" is characterized by a surface roughness (Ra) less than or equal to 0.25 microns.

As used herein the term "hydrophilic" is characterized by the contact angle for water of less than 90°, which means that the water droplet wets the surface.

As used herein the term "hydrophobic" is characterized by the contact angle for water of greater than 90°, which means that the water droplet does not wet the surface.

As used herein, "super-hydrophobicity" refers to a contact angle for deionized water at room temperature equal to or greater than 150° and "self-cleaning" refers to a tilt angle of equal to or less than 5°.

As used herein the term "lotus effect" is a naturally occurring effect first observed on lotus leaves and is characterized by having a randomly rough surface and low contact angle hysteresis, which means that the water droplet is not able to wet the microstructure spaces between the spikes. This allows air to remain inside the texture, causing a heterogeneous surface composed of both air and solid. As a result, the adhesive force between the water and the solid surface is extremely low, allowing the water to roll off easily and to provide the "self-cleaning" phenomena.

As used herein the term "petal effect" is based on microstructures and nanostructures observed on rose petals. These structures are larger in scale than the lotus leaf, which allows the liquid film to impregnate the texture. While the liquid can enter the larger scale grooves, it cannot enter into the smaller grooves. Since the liquid can wet the larger scale grooves, the adhesive force between the water and solid is very high. The water drops maintain their spherical shape due to the hydrophobicity of the petal (contact angle of 152°). This explains why the water droplet will not fall off even if the petal is tilted at an angle or turned upside down.

As used herein, the term "tilt angle" or "roll-off angle" means the smallest angle between a surface containing a water droplet and the horizontal surface at which the droplet commences to and keeps rolling off.

As used herein, the term "coating" means deposit layer applied to part or all of an exposed surface of a substrate.

As used herein, the term "coating thickness" or "layer thickness" refers to depth in a deposit direction and typical thicknesses exceed 50 micron, preferably 100 micron to accommodate the height/depth of the surface features required to obtain the lotus or petal effect.

As used herein, "exposed surface" and "outer surface" refer to all accessible surface area of an object accessible to a liquid. The "exposed surface area" refers to the summation of all the areas of an article accessible to a liquid.

As used herein, the term "surface structures" or "surface sites" refers to surface features including recesses, pits, crevices, dents, depressions, elevations, protrusions and the like purposely created in the metallic material to decrease its wetability and increase the contact angle.

As used herein, the term "population of primary surface structures" refers to number of primary, micron-sized, surface features per unit length or unit area. The "linear population of surface structures" can be obtained by counting the number of structures, e.g., on a cross sectional image and normalizing it per unit length, e.g., per mm. The average "areal population of surface structures" is the square of the average linear population, e.g., expressed in $cm^2$ or $mm^2$. Alternatively, the average areal density can be obtained by counting the number of features visible in an optical micrograph, SEM image or the like and normalizing the count for the measurement area.

As used herein, "surface roughness", "surface texture" and "surface topography" mean a regular and/or an irregular surface topography containing surface structures. Surface roughness consists of surface irregularities which result from the various surface preconditioning methods used such as mechanical abrasion and etching to create suitable surface structures. These surface irregularities/surface structures combine to form the "surface texture" presumably retaining air and are believed to be responsible for the increase in contact angle when compared to a flat surface, particularly, when these features also contain sub-texturing or secondary texturing on the nanoscale, i.e., below 100 nm.

According to one aspect of the present invention, a super-hydrophobic and/or self-cleaning polymeric article is provided by embossing a polymer with a fine-grained and/or amorphous metallic die by compression, injection molding or embossing. The fine-grained and/or amorphous metallic die can be produced by a number of processes, as highlighted in detail in co-pending application entitled "METALLIC ARTICLES WITH HYDROPHOBIC SURFACES". Preferably, a convenient and economic process is employed, e.g., electrodeposition, which generally comprises the steps of (i)

positioning the metallic or metallized work piece to be plated in a plating tank containing a suitable electrolyte and a fluid circulation system, (ii) providing electrical connections to the work piece/cathode to be plated and to one or several anodes, and (iii) plating a structural layer of a metallic material with an average grain size of equal to or less than 5,000 nm and/or an amorphous microstructure.

If the desired relief form is not engraved into or otherwise embedded in the surface of the cathode used as a work piece for the electrodeposition it can be added afterwards. In this case the appropriate surface structures in the electrodeposited mold surface are generated on at least portions of the metallic surface, e.g., by applying at least one process selected from the group of mechanical abrasion, shot-peening, anodic dissolution, anodic assisted chemical etching, chemical etching and plasma etching. Other applicable methods include, but are not limited to, micro-machining and nano-machining, micro-stamping, micro-profiling and laser ablation. A particularly preferable and economic process entails the application of shot-peening followed by etching.

It is understood that the use of such processes, while generally modifying the surface, does not inadvertently yield a suitable mold capable of rendering the embossed polymer super-hydrophobic and self-cleaning and that not each and every process under each and every arbitrary process condition will yield the desired increase in contact angle in the embossed material surface. The Applicants found that the process sequence of processing steps and process parameters had to be suitably adjusted and optimized to achieve the desired population and dimensions of surface sites to yield the desired liquid repellency in the embossed polymer surface. For example, in the case of using shot-peening, depending on the hardness of the surface to be modified, the Applicants found that the peening media hardness and size, the peening pressure and the peening duration had to be optimized to achieve the surface structures required for raising the contact angle. Similarly, the Applicants found that, for example, in the case of etching, depending on the chemical composition of the surface, the etching media, process temperature and duration had to be optimized to establish the surface sites required for raising the contact angle.

Suitable embossing dies comprise a single or several fine-grained and/or amorphous metallic layers as well as multi-layer laminates composed of alternating layers of fine-grained and/or amorphous metallic layers which are free standing or are applied as coatings to at least a portion of a suitable substrate.

The fine-grained metallic coatings/layers of suitable embossing dies have a grain size under 5 μm (5,000 nm), preferably in the range of 2 nm to 1,000 nm, more preferably between 10 nm and 500 nm. The grain size can be uniform throughout the deposit; alternatively, embossing dies can consist of layers with different microstructure/grain size. Amorphous microstructures and mixed amorphous/fine-grained microstructures are within the scope of the invention as well.

The fine-grained and/or amorphous embossing dies can contain particulates dispersed therein, i.e., they can be metal matrix composites (MMCs). The particulates can be permanently retained within the metal matrix and/or they can be chosen to be soluble in the etchant to further enhance the desired size and population of surface structures contributing to the rise in contact angle in the metallic material as well as in the embossed surfaces.

According to the present invention, the entire surface of the embossed article can be imprinted with the super-hydrophobic and/or self-cleaning surface features; alternatively, patches or sections can be formed on selected areas of the article, e.g., selected sections or sections particularly prone to heavy use and/or exposure to water in all of its forms, i.e., accumulations of sea or fresh water, rain, hail, snow, ice, or wet surfaces such as consumer and sporting goods, automotive and aerospace components and the like.

The following listing further defines the exemplary fine-grained and/or amorphous metallic embossing die material used for practicing the invention:

Metallic Coating/Metallic Layer Specification

Metallic materials comprising at least one element selected from the group consisting of Ag, Al, Au, Co, Cr, Cu, Fe, Ni, Mo, Pb, Pd, Pt, Rh, Ru, Sn, Ti, W, Zn and Zr, Other alloying additions optionally comprising at least one element selected from the group consisting of B, C, H, O, P and S.

Particulate additions optionally comprising at least one material selected from the group consisting of: metals and metal oxides selected from the group consisting of Ag, Al, In, Mg, Si, Sn, Pt, Ti, V, W, Zn; carbides and nitrides, including, but not limited to, Al, B, Cr, Bi, Si, W; carbon (carbon nanotubes, diamond, graphite, graphite fibers); glass; and self lubricating materials including, but not limited to, $MoS_2$, polymer materials (PTFE, PVC, PE, PP, ABS, epoxy resins). Particulate additions are preferably in the form of powders, fibers, nanotubes, flakes, and the like.

| | |
|---|---|
| Microstructure: | Amorphous or crystalline |
| Minimum average grain size [nm]: | 2; 5; 10 |
| Maximum average grain size [nm]: | 100; 500; 1,000; 5,000; 10,000 |
| Metallic layer Thickness Minimum [μm]: | 1; 10; 25; 30; 50; 100 |
| Metallic layer Thickness Maximum [mm]: | 1; 5; 25 |
| Minimum particulate particle size [μm]: | 0.01; 0.1 |
| Maximum particulate particle size [μm]: | 5, 10 |
| Minimum particulate fraction [% by volume]: | 0; 1; 5; 10 |
| Maximum particulate fraction [% by volume]: | 50; 75; 95 |
| Minimum Yield Strength Range [MPa]: | 100; 300 |
| Maximum Yield Strength Range [MPa]: | 2,750 |
| Minimum Hardness [VHN]: | 50; 100; 200; 400 |
| Maximum Hardness [VHN]: | 800; 1,000; 2,000 |
| Minimum contact angle on smooth surface for deionized water at room temperature [°]: | 0, 25, 50, <90, <95, <100 |
| Maximum contact angle on smooth surface for deionized water at room temperature [°]: | 160, 180 |

| | |
|---|---|
| Wetproofed (Textured) Embossed Layer Surface Specification: | |
| Minimum contact angle of textured surface for deionized water at room temperature [°]: | ≧125; ≧130; ≧140 |
| Maximum contact angle on textured surface for deionized water at room temperature [°]: | 160, 180 |
| Minimum increase in contact angle for deionized water at room temperature of the embossed surface when compared to the flat and smooth surface of the same composition [°]: | 40, 50 |
| Maximum contact angle for deionized water at room temperature of the embossed surface when compared to the flat and smooth surface of the same composition [°]: | 60, 70, 90 |
| Minimum linear population of micron-sized (primary) surface structures [number per mm]: | 5, 10 |
| Maximum linear population of micron-sized (primary) surface structures [number per mm]: | 100; 1,000 |
| Minimum areal population of micron-sized (primary) surface sites [number per mm$^2$]: | 10, 25, 100 |
| Maximum areal population of micron-sized | 5,000; $10^5$; $10^6$ |

-continued

Wetproofed (Textured) Embossed Layer Surface Specification:

| (primary) surface sites [number per mm²]: | |
|---|---|
| Minimum micron-sized (primary) surface structure diameter, spacing or depth [μm]: | 1, 5, 10 |
| Maximum micron-sized (primary) surface structure diameter, spacing or depth [μm]: | 50, 100, 250, 1000 |
| Minimum micron-sized (secondary) surface structure diameter, spacing or depth [nm]: | 1, 5 |
| Maximum micron-sized (secondary) surface structure diameter, spacing or depth [nm]: | 75, 90, 95, 100 |
| Surface structure topography: | recesses; cavities; pitted surface structures; holes; pores; depressions; grooved, roughened and etched surface sites; or open foam type structures; "brain", "cauliflower", "worm", "coral", elevations, protrusions and other three dimensionally interconnected porous surface structures |

Typically any number of different surface structures is present in the suitably textured surface, their shapes and areal densities can be irregular and the clear identification of individual surface structures can, at times, be subject to interpretation.

Embossed Layer Substrate Specification

Polymeric materials comprise at least one of: unfilled or filled epoxy, phenolic or melamine resins, polyester resins, urea resins; thermoplastic polymers such as thermoplastic polyolefins (TPOs) including polyethylene (PE) and polypropylene (PP); polyamides, mineral filled polyamide resin composites; polyphthalamides, polyphtalates, polystyrene, polysulfone, polyimides; neoprenes; polybutadienes; polyisoprenes; butadiene-styrene copolymers; poly-ether-ether-ketone (PEEK); polycarbonates; polyesters; liquid crystal polymers such as partially crystalline aromatic polyesters based on p-hydroxybenzoic acid and related monomers; polycarbonates; acrylonitrile-butadiene-styrene (ABS); chlorinated polymers such polyvinyl chloride (PVC); and fluorinated polymers such as polytetrafluoroethylene (PTFE). Polymers can be crystalline, semi-crystalline or amorphous.

Filler additions: metals (Ag, Al, In, Mg, Si, Sn, Pt, Ti, V, W, Zn); metal oxides ($Ag_2O$, $Al_2O_3$, $SiO_2$, $SnO_2$, $TiO_2$, ZnO); carbides of B, Cr, Bi, Si, W; carbon (carbon, carbon fibers, carbon nanotubes, diamond, graphite, graphite fibers); glass; glass fibers; fiberglass metallized fibers such as metal coated glass fibers; mineral/ceramic fillers such as talc, calcium silicate, silica, calcium carbonate, alumina, titanium dioxide, ferrite, mica and mixed silicates (e.g. bentonite or pumice).

Minimum particulate/fiber fraction [% by volume]: 0; 1; 5; 10

Maximum particulate/fiber fraction [% by volume]: 50; 75; 95

Surface structures generated with selected processes described herein include sandblasting and etching typically which are inexpensive and yield a somewhat random distribution of surface sites. Regularly spaced and sized surface sites of defined shape and uniform size can be created by micromachining (e.g., laser scribing, laser ablation and micro- and nano-machining) or LIGA processes to a preform, followed by deposition of the fine-grained and/or amorphous material into these "mold preforms", followed by removal of the fine-grained and/or amorphous metallic layer from the preform molds. As also indicated, the micron sized recesses preferably further contain an additional substructure, e.g., sub-micron sized structures as observed in lotus leaves or rose petals, which can be conveniently created in the relief form by, e.g., shot-peening and etching. Therefore determining the average size, and linear or areal density of such sites to achieve the desired hydrophobicity is at times challenging. In light of these challenges, for the purpose of the present invention, one reliable method therefore to characterize such surfaces is to measure their contact angle for water at room temperature which was observed to be a reliable and reproducible property.

DETAILED DESCRIPTION

The present invention relates to embossing the surface of hydrophobic materials, preferably polymeric materials, to render their exposed outer surface super-hydrophobic and/or self-cleaning. The metallic fine-grained and/or amorphous embossing dies are produced by a number of convenient processes including, but not limited to, DC or pulse electrodeposition, electroless deposition, physical vapor deposition (PVD), chemical vapor deposition (CVD) and gas condensation or the like. Other processing techniques for forming the desired microstructure include, but are not limited to, rapid solidification and severe plastic deformation. The required surface structures are created by a number of conventional processes ranging from micromachining to shot-peening followed by etching.

The person skilled in the art of plating will know how to electroplate or electroless plate selected fine-grained and/or amorphous metals, alloys or metal matrix composites choosing suitable plating bath formulations and plating conditions. Similarly, the person skilled in the art of PVD, CVD, gas condensation, severe plastic deformation and rapid solidification techniques will know how to prepare fine-grained and/or amorphous metal, alloy or metal matrix composite coatings.

The Applicants have surprisingly discovered that the microstructure of the metallic material significantly affects the performance of the embossing dies and fine-grained and/or amorphous metallic embossing dies are superior to conventional metals having a coarse grained microstructure.

As highlighted, optionally, the patterned metallic embossing die surface can be at least partly subjected to a suitable finishing treatment, which can include, among others, electroplating, i.e., chromium plating and applying a polymeric material.

Numerous attempts have been made to identify, characterize and quantify desired surface structures which result in achieving the desired wetting properties in embossed polymers and to quantify the surface topography and surface roughness in quantifiable scientific terms. Heretofore, these efforts have not succeeded in part because of the complexity of the surface features and the numerous parameters such as population, size and shape of the surface structures which affect the contact angle. Furthermore, the polymer surface can be at least partially oxidized by a suitable chemical and/or heat treatment or surface oxidation occurs naturally with time.

According to the present invention, surface structures containing the desired dual-scale roughness in the polymeric articles are suitably created by intimate contact with the embossing die surface as can be achieved by compression molding, injection molding, polymer casting or any other suitable polymer casting, shaping or processing method as described in detail in copending application entitled "METALLIC ARTICLES WITH HYDROPHOBIC SURFACES," U.S. Ser. No. 12/785,650.

Combinations of two or more of the aforementioned processes can be used as well and the specific treatment conditions typically need to be optimized to maximize the change in contact angle. As highlighted, fine-grained and/or amorphous metals which are shot-peened followed by etching produce particularly suitable embossing dies.

Articles and parts suitably embossed with the appropriate dies include a variety of materials, preferably polymeric substances. Suitable polymeric substrates include crystalline, semi-crystalline and/or amorphous resins as well as unfilled or filled resins. Suitable polymeric substrates include epoxy, phenolic and melamine resins, polyester resins, urea resins; thermoplastic polymers such as thermoplastic polyolefins (TPOs) including polyethylene (PE) and polypropylene (PP); polyamides, including aliphatic and aromatic polyamides, mineral filled polyamide resin composites; polyphthalamides; polyphtalates, polystyrene, polysulfone, polyimides; neoprenes; polybutadienes; polyisoprenes; butadiene-styrene copolymers; poly-ether-ether-ketone (PEEK); polycarbonates; polyesters; liquid crystal polymers such as partially crystalline aromatic polyesters based on p-hydroxybenzoic acid and related monomers; polycarbonates; acrylonitrile-butadiene-styrene (ABS); chlorinated polymers such polyvinyl chloride (PVC); and fluorinated polymers such as polytetrafluoroethylene (PTFE). Useful thermoplastic resins include poly(oxymethylene) and its copolymers; polyesters such as poly (ethylene terephthalate), poly (1,4-butylene terephthalate), poly (1,4-cyclohexyldimethylene terephthalate), and poly (1,3-propyleneterephthalate); polyamides such as nylon-6,6, nylon-6, nylon-12, nylon-11, nylon-10,10, and aromatic-aliphatic copolyamides; polyolefins such as polyethylene (i.e., all forms such as low density, linear low density, high density, etc.), polypropylene, polystyrene, polystyrene/poly (phenylene oxide) blends, polycarbonates such as poly (bisphenol-A carbonate); fluoropolymers including perfluoropolymers and partially fluorinated polymers such as copolymers of tetrafluoroethylene and hexafluoropropylene, poly (vinyl fluoride), and the copolymers of ethylene and vinylidene fluoride or vinyl fluoride; poly-sulfides such as poly (p-phenylenesulfide); polyetherketones such as poly (ether-ketones), poly (ether-ether-ketones), and poly (ether-ketone-ketones); poly (etherimides); acrylonitrile-1,3-butadinene-styrene copolymers; thermoplastic (meth)acrylic polymers such as poly (methyl methacrylate); and chlorinated polymers such as poly (vinyl chloride), polyimides, polyamideimides, vinyl chloride copolymer, and poly (vinylidene chloride). Useful "thermotropic liquid crystalline polymer" (LCP) include polyesters, poly (ester-amides), and poly (ester-imides). One preferred form of polymer is "all aromatic", that is all of the groups in the polymer main chain are aromatic (except for the linking groups such as ester groups), but side groups which are not aromatic may be present. The thermoplastics may be formed into parts by the usual methods, such as injection molding, thermoforming, compression molding, extrusion, and the like.

These polymeric articles frequently contain fillers including carbon, carbon nanotubes, graphite, graphite fibers, carbon fibers, metals, metal alloys, glass and glass fibers; fiberglass, metallized fibers such as metal coated glass fibers; pigments, dyes, stabilizers, toughening agents, nucleating agents, antioxidants, flame retardants, process aids, and adhesion promoters and the like. Appropriate filler additions in the substrate range from as low as 2.5% per volume or weight to as high as 95% per volume or weight. In addition to fibrous reinforcing fillers with a high aspect ratio, other fillers such as glass, ceramics and mineral fillers such as talc, calcium silicate, silica, calcium carbonate, alumina, titanium dioxide, ferrite, and mixed silicates (e.g. bentonite or pumice) can be employed as well.

Particularly suitable polymer composites include carbon/graphite fiber and glass fiber resin composites in which the resin components include phenolic resins, epoxy resins, polyester resins, urea resins, melamine resins, polyimide resins, polyamide resins as well as elastomers such as natural rubber, polybutadienes, polyisoprenes, butadiene-styrene copolymers, polyurethanes, and thermoplastics such as polyethylene, polypropylene, and the like.

Suitable super-hydrophobic and/or self-cleaning articles processed according to the present invention include, but are not limited to, parts used in aerospace, automotive, building material and other industrial applications. Carbon/graphite-fiber polymer composites are a popular choice for lightweight aerospace components including plane fuselage, wings, rotors, propellers and their components as well as other external structures that are prone to erosion by the elements including wind, rain, hail and snow.

The following working example illustrates the benefits of the invention, reporting the static contact angle and tilt angle for water of smooth polymers, as well as embossed polyethylene using dies with various microstructures specifically for fine-grained, coarse-grained and amorphous metallic embossing dies Working Example Comparison of Contact Angle and Tilt Angle of Polyethylene Imprinted with Various Coarse-Grained, Fine-Grained and Amorphous Embossing Dies In this example, 10 cm×10 cm×0.25 mm metallic embossing dies were made from three different materials, namely, (a) coarse-grained Ni with an average gain size of 30 microns (prior art); (b) fine-grained Ni with an average gain size of 15 nm (this invention); and (c) amorphous Co-9P (this invention). Coarse-grained Ni was procured from McMaster-Carr (Aurora, Ohio, USA) in the form of cold rolled & annealed metal sheet. Fine-grained Ni and amorphous Co—P sheets were prepared according to U.S. Pat. No. 5,352,266, and copending application U.S. Ser. No. 12/785,520. The sheets are available from Integran Technologies Inc. (www.integran.com; Toronto, Canada), the assignee of the present application. Fine-grained metal matrix coupons and amorphous coupons were electroformed as described in U.S. Patent Publication No. 2005/0205425, also available from Integran Technologies Inc.

To achieve a reproducible and comparable surface the metal surface of each sample to be used for the embossing die was initially ground flat up to 2400 grit SiC paper, rinsed in ethanol, ultrasonically cleaned in ethanol and air dried at room temperature. To eliminate any potential contamination, no polishing compounds were employed.

Embossing dies were prepared from the coarse-grained, fine-grained, or amorphous metal sheet as follows:
(i) No further surface preparation;
(ii) Chemical etching: etching was performed in 5% HNO3 for about 30 min at room temperature. Following the etching, samples were rinsed in deionized water and submerged in suitable neutralizing solution, rinsed again and then ultrasonically cleaned in ethanol and air dried at room temperature;
(iii) Shot-peening: shot-peening was performed at about 87 psi (about 10 passes) using 180 grit alumina media at a distance of about 10 cm, followed by rinsing in ethanol, ultrasonic cleaning in ethanol, followed by air drying at room temperature;
(iv) Process (ii) followed by process (iii), i.e., etching followed by shot-peening; and
(v) Process (iii) followed by process (ii), i.e., shot-peening followed by etching.

The fifteen relief forms (five each for the three different microstructures) were used to emboss 10×10 cm polypropylene plaques procured from McMaster-Carr (Aurora, Ohio, USA) by hot-pressing at about 160° C. After processing, the contact angle of the all processed polyethylene surfaces was measured. In all cases, the contact angle was measured by placing multiple 5 μl droplets of deionized water on the flat sample surface and taking a picture with a stereoscope at 15× magnification after properly aligning the camera with the horizontal plane of the sample. Contact angle measurements were taken from the digitally captured images using the Image-pro software in triplicates on both sides of each droplet. In all cases the average of all contact angle measurements is reported.

The contact angle and tilt angle measurements for polypropylene imprinted with a variety of dies is displayed in Table 1. The data illustrates a dramatic difference in contact angles and tilt angle depending on the microstructure and the surface processing employed on the metallic embossing die. The data illustrate that super-hydrophobicity and self-cleaning properties can not be achieved using coarse-grained embossing dies. In the case of fine-grained and/or amorphous metallic dies, super-hydrophobicity and self-cleaning properties were achieved only if the die surface processing involved shot-peening followed by chemical etching according to the exemplary process highlighted in FIG. 1 generating the dual-scale surface structures.

TABLE 1

Contact Angles and Tilt Angles of Polyethylene Sheets Embossed with Coarse-Grained, Fine-Grained and Amorphous Embossing Dies Containing Various Surface Structures.

| | Die Microstructure | | | | | |
| --- | --- | --- | --- | --- | --- | --- |
| | Coarse-grained Ni Dies (Prior Art) | | Fine-Grained Ni Dies | | Amorphous Co-9P Dies | |
| Polypropylene Surface: | Contact Angle [degrees] | Tilt Angle [degrees] | Contact Angle [degrees] | Tilt Angle [degrees] | Contact Angle [degrees] | Tilt Angle [degrees] |
| Smooth Surface | 93 | 38 | 93 | 38 | 93 | 38 |
| Embossed with Die with Etched Surface | 104 | 27 | 99 | 25 | 96 | 30 |
| Embossed with Die with Shot Peened Surface | 119 | 31 | 130 | 24 | 135 | 23 |
| Embossed with Die with Surface Etched followed by Shot-Peening | 131 | 30 | 139 | 22 | 124 | 39 |
| Embossed with Die with Surface Shot-Peened followed by Etching | 122 | 30 | 151 | <5 | 153 | <5 |

Figure 1:
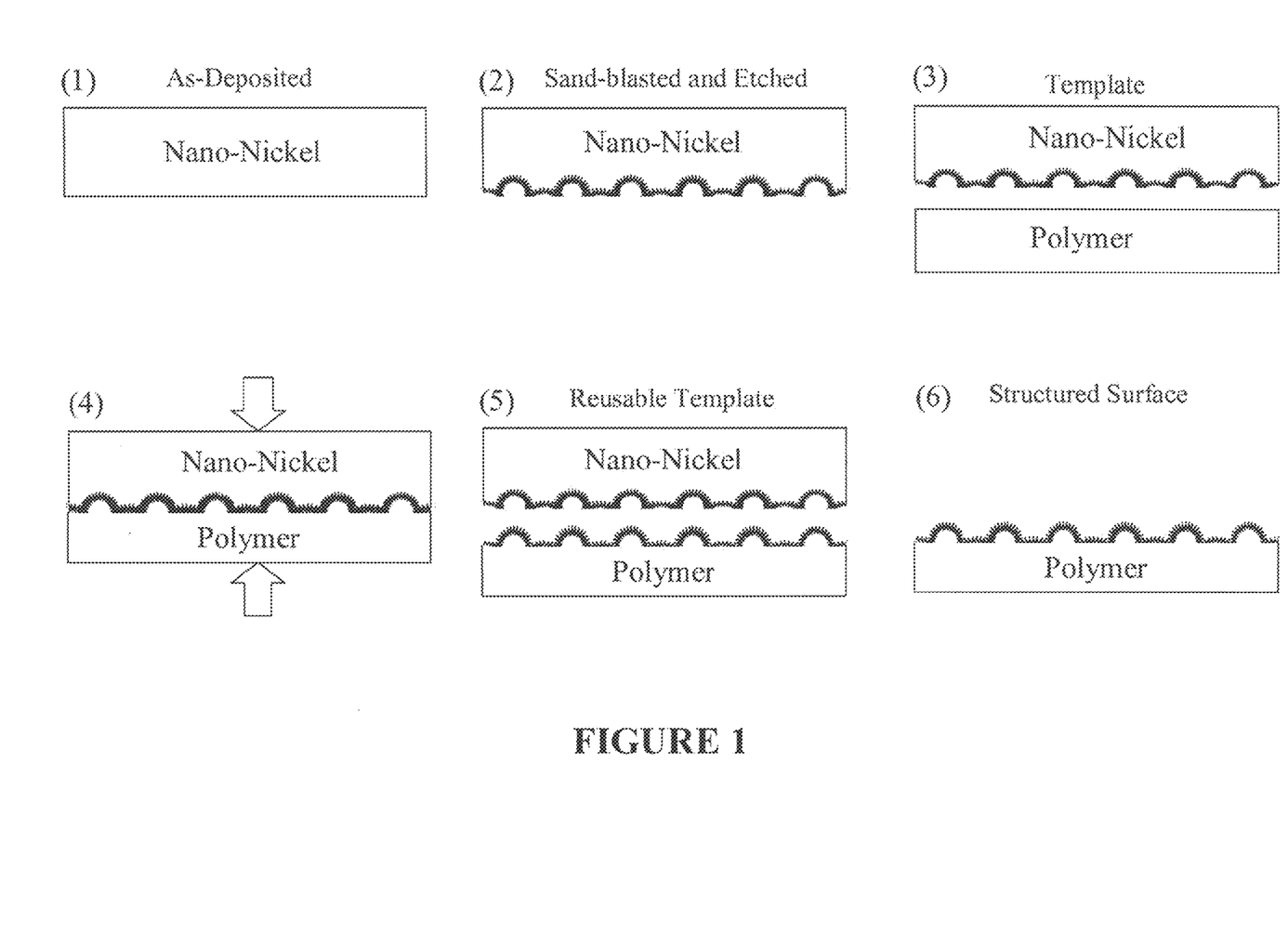
FIG. 1 illustrates an exemplary process showing each exemplary process step to form a relief form and create a hydrophobic surface in a suitable polymer using the relief form according to one of the embodiments of the present invention.

FIG. 1 schematically illustrates the exemplary process described above. As shown, the exemplary embossing die has a microstructure which is fine-grained with an average grain size between 2 nm and 5,000 nm. As indicated previously, the embossing die can also have an amorphous microstructure. The embossing die has at least an exposed surface portion having structures incorporated therein by, for example, shot-peening followed by etching. The surface structures can have a dual microstructure. Particularly, according to one aspect, the surface structures include a primary surface structure and a secondary surface structure which at least partially overlays the primary surface structure. The primary surface structure has macro-features in the range of 1 μm to 1,000 μm and secondary surface structure has ultra-fine features in the range of 1 nm to 100 nm. As shown, the primary and secondary surface features can include, for example, elevations, depressions, pits, crevices, cavities, and the like. The embossing die having the relief form is then used to emboss a polymer. This results in the exposed surface of the polymer having the same dual microstructure as the embossing die, which, in turn, provides a polymer article having a contact angle and tilt angle for water at room temperature set forth in Table 1 above.

Figure 2:
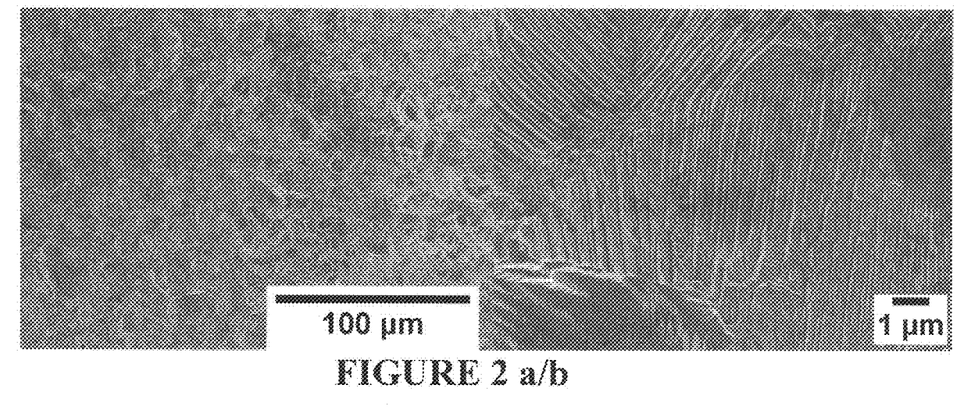
FIG. 2 illustrates a micrograph of a modified surface of coarse-grained nickel (Ni) (average grain size: 30 μm) after shot-peening and chemical etching illustrating the appearance of the treated surface at low magnification in FIG. 2a and a high magnification in FIG. 2b. The figures reveal the lack of a dual-scale surface roughness.
Figure 3:
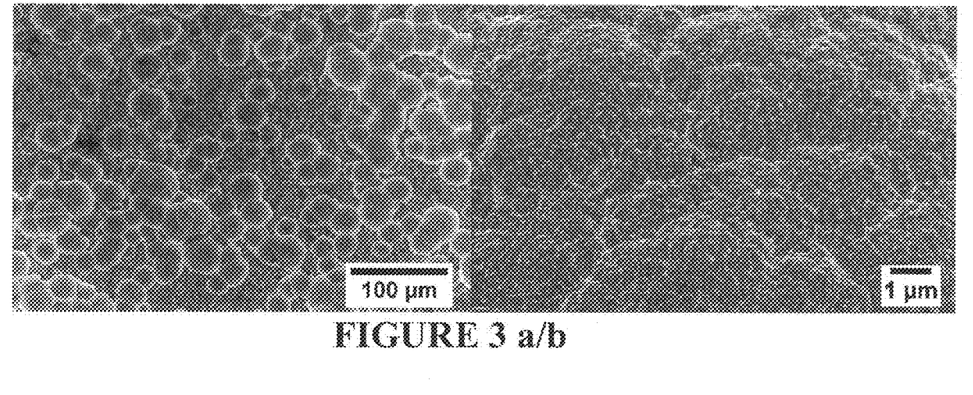
FIG. 3 illustrates a micrograph of modified surface of fine-grained nickel (Ni) (average grain size: 15 nm) after shot-peening and chemical etching illustrating the dual-scale surface roughness at low magnification in FIG. 3a and a high magnification in FIG. 3b.

FIGS. 2 through 3 illustrate the prevailing surface structures generated on selected nickel (Ni) dies. Specifically, FIG. 2 illustrates a micrograph of modified surface of polycrystalline nickel (Ni) (average grain size; 30 μm) after shot-peening (10 passes at 87 psi with 180 grit alumina at a distance of 10 cm) and chemical etching (5% HNO3@room temperature for about 30 minutes) at low magnification in FIG. 2a and a high magnification in FIG. 2b, illustrating the lack of a dual-scale surface roughness.

FIG. 3 illustrates the fine-grained nickel (Ni) surface after the shot-peened surface (10 passes at 87 psi with 180 grit alumina at a distance of 10 cm) has been exposed to a chemical etching treatment (5% HNO3@room temperature for about 30 minutes). Specifically, FIG. 3a indicates the spherical depression with a diameter ranging from 10 microns to 50 microns generated, presumably as the sites struck by the alumina shot act as local corrosion sites promoting etching. FIG. 3b is a much higher magnification image of the very same surface focusing in on a depression, revealing the secondary roughness with features visible from less than 1 micron to about 5 microns. Further magnification (TEM/not shown) visualizes a number of features much below 100 nm in size. A dramatic difference in surface morphology is visible when comparing the processed coarse-grained surface of FIG. 2 with the fine-grained nickel (Ni) surface of FIG. 3 explaining the observed differences in contact angles when used as embossing dies.

Figure 4:
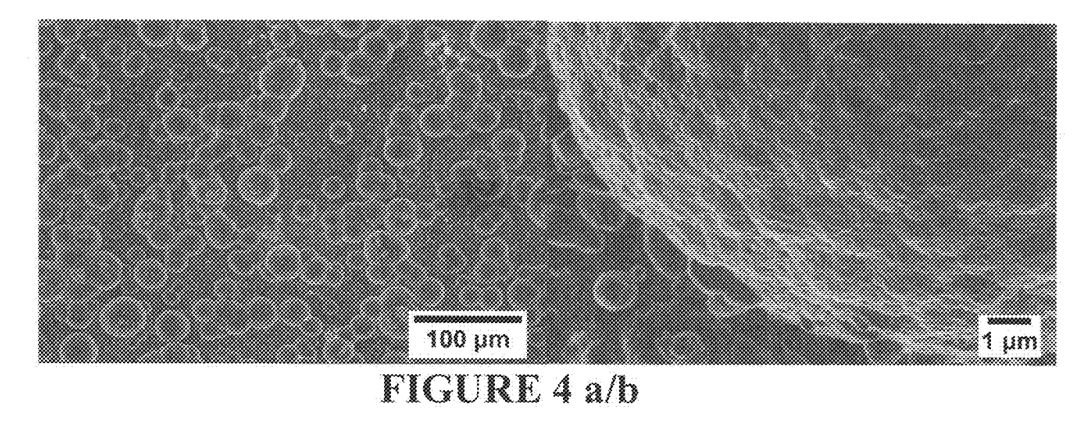
FIG. 4 illustrates a micrograph of a polypropylene sheet embossed with the relief pattern of the embossing die as illustrated in FIG. 3 to illustrate that the primary and the secondary surface structures were indeed transferred from the metallic embossing die onto the polymer surface. The modified polypropylene surface containing the dual-scale surface roughness is illustrated at low magnification in FIG. 4a and a high magnification in FIG. 4b.

FIG. 4 illustrates the polyethylene surface after embossing with the fine-grained nickel (Ni) surface of FIG. 3. Specifically FIG. 4a indicates the spherical protrusions generated by the embossing die with a diameter ranging from 10 microns to 50 microns generated and FIG. 4b is a much higher magnification image of the very same surface focusing in on a the edge of the protrusion, indicating the secondary roughness with features visible from less than 1 micron to about 5 microns has been successfully transferred from the embossing die to the polymer surface. Again further magnification (TEM/not shown) illustrates that the very small features (much below 100 nm in size) observed on the embossing dies are transferred as well.

Table 1 above indicates that the contact angle on polyethylene using prior art, coarse-grained dies can be ultimately increased from 93° to 131° (38° increase), whereas in the case of fine-grained dies the contact angle is ultimately increased from 93° to 151° (58° increase), and in the case of amorphous dies the contact angle is ultimately increased from 93° to 153° (60° increase). Similarly the tilt angle/roll off angle of the embossed polyethylene is affected as well, namely in the case of coarse-grained dies the tilt angle is ultimately lowered from 38° to 27° (11° decrease), whereas in the case of fine-grained and amorphous dies the tilt angles are ultimately lowered from 38° to less than 5° (greater than 33° decrease). Table 1 also indicates that only polyethylene plaques embossed with fine-grained or amorphous dies that have been shot-peened, followed by etching achieved super-hydrophobicity and self-cleaning behavior.

Similar results have been obtained by using other metallic material compositions for embossing dies and when imprinting other polymers including filled and unfilled polyamides, ABS, PTFE and polypropylenes.

The foregoing description of the invention has been presented describing certain operable and preferred embodiments. It is not intended that the invention should be so limited since variations and modifications thereof will be obvious to those skilled in the art, all of which are within the spirit and scope of the invention.

The invention claimed is:

1. A method for manufacturing an article formed of a polymeric material and having at least one of a hydrophobic and self-cleaning outer surface, the method for manufacturing comprising the steps of:
    (i) providing an embossing die formed of a metallic material, the metallic material having at least one of a microstructure which is fine-grained with an average grain size between 2 and 5,000 nm and an amorphous microstructure;
    (ii) incorporating surface structures into at least an exposed metallic material surface portion of the embossing die, the metallic material surface structures increasing the contact angle for water at room temperature to over 90° and rendering the inherently hydrophilic surface of the metallic material hydrophobic; and
    (iii) imprinting at least a portion of an outer surface of the article directly with the imprinted metallic material surface portion of the embossing die to increase the contact angle for water at room temperature of said outer surface portion of the article to at least 130° and decrease the tilt angle for water at room temperature of said outer surface portion of the article to less than or equal to 25°.

2. The method according to claim 1, wherein the outer surface portion of the article comprises randomly distributed surface structures containing a plurality of micron-sized features, wherein the plurality of micron-sized features further has a substructure comprising of a plurality of nano scale features.

3. The method according to claim 1, wherein the metallic material surface is treated by at least one process selected from the group consisting of chemical etching, electrochemical etching, plasma etching, shot-pending, grinding, machining.

4. The method according to claim 3, wherein the metallic material surface is treated by shot-peening followed by etching.

5. The method according to claim 1, wherein said metallic material is selected from the group of:
    (i) one or more metals selected from the group consisting of Ag, Al, Au, Co, Cr, Cu, Fe, Ni, Mo, Pd, Pt, Rh, Ru, Sn, Ti W, Zn and Zr,
    (ii) pure metals or alloys containing at least two of the metals listed in (i), further containing at least one element selected from the group of B, C, H, O, P and S;
    (iii) any of (i) or (ii) where said metallic coating also contains particulate additions in the volume fraction between 0 and 95% by volume.

6. The method according to claim 5, wherein the metallic material contains particulate addition of at least 1% by volume and said particulate addition is of one or more materials which is a metal selected from the group consisting of Ag, Al, Cu, In, Mg, Si, Sn, Pt, Ti, V, W, Zn; a metal oxide selected from the group consisting of $Ag_2O$, $Al_2O_3$, $SiO_2$, $SnO_2$, $TiO_2$, ZnO; a carbide of B, Cr, Bi, Si, W; carbon selected from the group consisting of carbon nanotubes, diamond, graphite, graphite fibers; ceramic, glass; and polymer material selected from the group consisting of PTFE, PVC, PE, PP, ABS, epoxy resin.

7. The method according to claim 1, further comprising imprinting the exposed surface portion of the embossing die with dual-roughness surface structures.

8. The method according to claim 7, wherein the dual-roughness surface structures comprise a primary surface structure and a secondary surface structure at least partially overlaying said primary surface structure, the primary surface structure including surface features having dimensions and a spacing between adjacent primary surface features in the range of 1 micron to 1,000 microns, the secondary surface structure including surface features having dimensions and a spacing between adjacent secondary surface features in the range of 1 nm to less than or equal to 100 nm.

9. The method according to claim 1, wherein said embossing die has an amorphous microstructure.

10. The method according to claim 1, wherein said embossing die comprises at least one metallic material selected from the group consisting of Ni, Co, Cu and Fe.

11. The method according to claim 1, wherein said embossing die comprises at least one element selected from the group consisting of Ni, Co and P.

12. The method according to claim 1, wherein said metallic material is selected from the group of:
 (i) one or more metals selected from the group consisting of Ag, Au, Co, Cr, Cu, Fe, Ni, Mo, Pd, Pt, Rh, Ru, Sn, Ti W, Zn and Zr,
 (ii) pure metals or alloys containing at least two of the metals listed in (i), further containing at least one element selected from the group of B, C, H, O, P and S;
 (iii) any of (i) or (ii) where said metallic coating also contains particulate additions in the volume fraction between 0 and 95% by volume.

13. A method for manufacturing an article formed of a polymeric material and having at least one of a hydrophobic and self-cleaning outer surface, the method for manufacturing comprising the steps of:

(i) providing an embossing die formed of a metallic material, the metallic material having at least one of a microstructure which is fine-grained with an average grain size between 2 and 5,000 nm and an amorphous microstructure;

(ii) imprinting surface structures into at least an exposed metallic material surface of the embossing die to define a textured surface portion by first shot-peening the metallic material surface and followed by etching the metallic material surface, the metallic material surface structures increasing the contact angle for water at room temperature of said textured surface portion by at least 40% as compared to a smooth surface portion of the metallic material surface having a surface roughness (Ra) less than or equal to 0.25 microns thereby rendering the inherently hydrophilic surface of the metallic material hydrophobic; and (iii) imprinting at least a portion of an outer surface of the article with the textured metallic material surface portion of the embossing die to increase the contact angle for water at room temperature of said outer surface portion of the article to at least 130° and decrease the tilt angle for water at room temperature of said outer surface portion of the article to less than or equal to 25°.

14. The method according to claim 13, further comprising imprinting the exposed surface of the embossing die with dual-roughness surface structures wherein the dual-roughness surface structures comprise primary surface structures and secondary surface structures at least partially overlaying said primary surface structures, a linear population of said primary surface structures being in the range of 5 to 1000 per mm.

* * * * *